(12) United States Patent
Takehiro

(10) Patent No.: US 8,496,516 B2
(45) Date of Patent: Jul. 30, 2013

(54) GAME DEVICE, TEMPO ANNOUNCEMENT METHOD, INFORMATION RECORDING MEDIUM AND PROGRAM

(75) Inventor: Masashi Takehiro, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 61 days.

(21) Appl. No.: 13/259,051

(22) PCT Filed: Mar. 16, 2010

(86) PCT No.: PCT/JP2010/054438
§ 371 (c)(1),
(2), (4) Date: Sep. 22, 2011

(87) PCT Pub. No.: WO2010/110124
PCT Pub. Date: Sep. 30, 2010

(65) Prior Publication Data
US 2012/0015729 A1    Jan. 19, 2012

(30) Foreign Application Priority Data
Mar. 25, 2009    (JP) .................................. 2009-073207

(51) Int. Cl.
*A63F 13/00*    (2006.01)
(52) U.S. Cl.
USPC .................................. 463/7; 463/35; 463/42

(58) Field of Classification Search
USPC ...................................... 463/31, 35–37, 42, 7
See application file for complete search history.

(56) References Cited

U.S. PATENT DOCUMENTS
6,645,067 B1 * 11/2003 Okita et al. ..................... 463/7

FOREIGN PATENT DOCUMENTS
| JP | 2001-222280 | 8/2001 |
| JP | 2003-122487 | 4/2003 |
| JP | 3579042 B1 | 10/2004 |
| JP | 2006-031484 | 2/2006 |

OTHER PUBLICATIONS
Written Opinion dated Apr. 27, 2010.

* cited by examiner

*Primary Examiner* — Omkar Deodhar
(74) *Attorney, Agent, or Firm* — Howard & Howard Attorneys PLLC

(57) ABSTRACT

A game device (200) that evaluates an operation of a player that is performed in step with music sounds comprises a music storage unit (201), tempo information acquisition unit (241), and tempo announcement unit (202), and is configured as follows. The music storage unit (201) stores music that is to be played. The tempo information acquisition unit (241) acquires tempo information for the music. The tempo announcement unit (202), based on the acquired tempo information, announces a tempo of the music before the music is played.

8 Claims, 8 Drawing Sheets

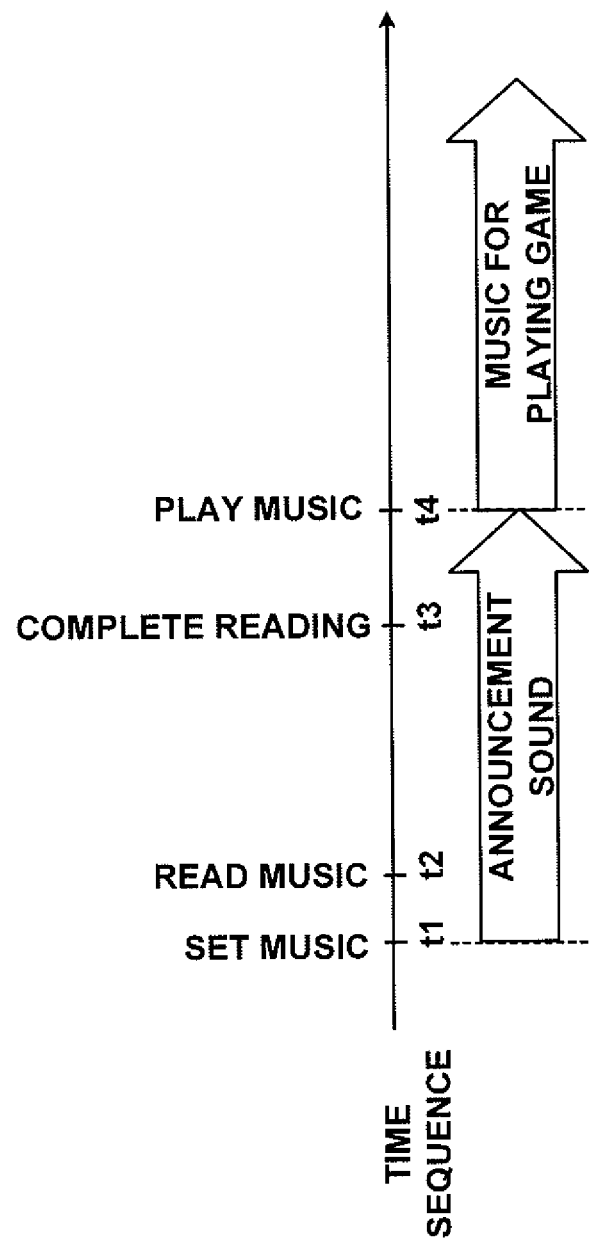

GAME DEVICE, TEMPO ANNOUNCEMENT METHOD, INFORMATION RECORDING MEDIUM AND PROGRAM

TECHNICAL FIELD

The present invention relates to a game device, tempo announcement method, information recording medium, and program that, in a game performed by a player in step with the rhythm of music, are suitable for making it possible to perform the first operation at proper timing and easily begin the game.

BACKGROUND ART

In the past, various games (software and the like) have been developed that are executed on an industrial use or home use game device. Of these, games that are collectively called music games (includes dance games and the like) are very popular and are supported by players of a wide range of ages.

Music games are a type of game in which the player competes for a high score by performing operations in good timing according to the tempo, scale, or the like of music that is played.

To explain this in more detail using an example, an image (hereafter, referred to as a "game image") that indicates a game status is displayed on a monitor screen, and the game image expresses the state of target objects that move in a plurality of moving lanes according to music that is played (played back). More specifically, a different target object appears in each of the moving lanes, and the target object, in step with the music, moves over the moving lane from a starting point to an ending point. These target objects correspond to buttons on a controller (including a game mat and the like) that is operated by a player, and instruct the player to press the corresponding buttons. A decision area is provided that crosses each of the moving lanes, and straight lines or objects having the same shape as the target objects are displayed in the decision area.

At the timing when the target object moving in the moving lane overlaps the straight line or the object inside the decision area, the player obtains a point(s) by pressing the button that corresponds to that target object.

In other words, the player is required to perform the operation of pressing corresponding buttons in good timing while watching and following the target objects that move in step with the music.

As an example of this kind of music game, inventions of game devices that are capable of changing the degree of difficulty according to a game status of a player have been disclosed (see, for example, Patent Literature 1). Patent Literature 1: Japanese Patent No. 3,579,042 (pages. 7 to 15, FIG. 4).

DISCLOSURE OF INVENTION

Problem to be Solved by the Invention

In this kind of music game, normally, an image for selecting music (hereafter, referred to as a "music selection image") is displayed on a monitor screen, and a player is able to freely select music desired to be used in playing the game. From that music selection image, a numerical value for the music tempo (BPM: Beats Per Minute), for example, is displayed, and by playing a part of the music as a preview, selection is made easy.

However, even though the tempo of the music was displayed as a numerical value, it was difficult for the player to get a feel for the tempo, and unless the game was actually played using that music (unless the music was heard), it was difficult to grasp the tempo of the music. Even in the case of playing part of the music as a preview, while the music is set and the game is actually played, the impression of that music fades, and again, unless the game was actually played, it was difficult to grasp the tempo of the music.

Therefore, at the beginning of the music for which the tempo of the music is not well understood, it became easy for a difference to occur between the timing displayed by the target object and the timing perceived by the player, so many players made errors in operation.

In a music game, by a player selecting portions of music in advance, or by the game device sequentially selecting music from among music used for playing the game in the past, it is possible to continuously play the game using portions of music.

When continuously playing the game using portions of music in this way, reading of music and the like may occur between other portions of music; however, it is possible to play the game using each portion of music in order in a relatively short interval. During that interval, the title of the next music is displayed, so the player can prepare to play the game using that music.

In this kind of continuous play as well, as in the case above, unless the game was actually played, it was difficult to get a feel for the tempo of the music, so at the beginning of the music, many players made errors in operation.

Moreover, because of unique problems with continuous play as will be described below, errors in operation at the beginning of the music were concerned.

In the case of continuous play, even in the case where the player is relatively skilled in playing the game for the next music, the previous music remains in the player's head, so at first it becomes difficult to match the timing of the next music played.

In other words, in the case where music is selected each time and the game is played one selection of music at a time, due to the operation for selecting the music, the music remaining in the player's head is wiped away, however, in the case of continuous play where that kind of operation is not necessary, the tempo (rhythm image) of the previous music remains in the player's feeling even after the previous music has been completed. Therefore, even though the next music begins to be played, there was a problem in that at the beginning of the music there were errors in operation.

Therefore, development of a game device that is capable of easily matching the timing of the initial operation in a music game when playing the game using selected music (easily grasping the tempo of the music), and that is capable of easily matching the timing of the initial operation of subsequent music during continuous play (easily switching the tempo of the music) has been desired.

The present invention is made by taking the above situation into consideration, and the object thereof is to provide a game device, tempo announcement method, information recording medium, and program that are suitable for making it easier to start a game by performing the initial operation at proper timing in the game wherein a player performs operation in step with the rhythm of music.

The game device of a first aspect of the present invention is a game device that evaluates the operation of a player that is performed in step with music sounds, comprising: a music storage unit, a tempo information acquisition unit, and a tempo announcement unit.

First, the music storage unit stores music (for example, music information that specifies a portion of music, tempo information that indicates the tempo of a portion of music, and the like) that is to be played. The tempo information acquisition unit acquires tempo information of the music. For example, the tempo information acquisition unit acquires tempo information that is stored in the music storage unit, or analyzes the music and acquires tempo information. The tempo announcement unit, based on the acquired tempo information, announces the tempo of the music before the music is played. For example, the tempo announcement unit generates and displays an image for announcing the tempo of a portion of music (hereafter, referred to as an "announcement image"), and/or outputs sound for announcing the tempo of a portion of music (hereafter, referred to as an "announcement sound", an example being BGM or a bass sound that follows the tempo).

In this way, the tempo of a portion of music is announced to a player before the music is played. As a result, when playing the game using a selected portion of music, it is possible to match the timing at the beginning of play. In other words, due to the tempo that is announced before the music is played, the player gets a feel for the tempo of the music, so as the music begins to be played, it is possible to match the timing of the first operation to the music. Also, in a music game, errors in operation at the beginning of the music are reduced.

Moreover, adverse effects in continuous play can be corrected by announcing the tempo of the next portion of music to the player between portions of music. That is, during continuous play, the previous music that is still in mind is removed by announcing of the tempo of the next music.

In other words, due to the tempo that is announced before the next portion of music is played, the player is able to switch the senses to the tempo of the next portion of music, so as the music begins to be played, it is possible to match the timing of the first operations to that music. In continuous play as well, errors in operation at the beginning of the music are reduced.

As a result, for music used in playing a game, it can become easy to start play from the beginning of the music by matching the timing.

The game device of a second aspect of the present invention is a game device that evaluates the operation of a player that is performed in step with music sounds, comprising: a music storage unit, a tempo information acquisition unit, a music reading unit, a tempo announcement unit, and a reproducing unit.

First, the music storage unit stores portions of music (for example, music information that specifies a portion of music, tempo information that indicates the tempo of a portion of music, and the like). The tempo information acquisition unit acquires tempo information of a portion of music that is to be played. For example, the tempo information acquisition unit acquires tempo information that is stored in the music storage unit, or analyzes the portion of music and acquires tempo information. The music reading unit reads the portion of music to a reproducing buffer, for example, so that the portion of music can be played. The tempo announcement unit, based on the acquired tempo information, announces the tempo of the portion of music while the portion of music is being read. For example, the tempo announcement unit generates and displays an image for announcing the tempo of a portion of music, and/or outputs sound for announcing the tempo of the portion of music (an example being BGM or a bass sound that follows the tempo). The reproducing unit plays the read music after the portion of music has been read.

In this way, the tempo of the music is announced to the player while the music is being read. As a result, when playing a game using selected music, it is possible to match the timing at the beginning of play. In other words, the player has gotten a feel for the tempo of a portion of music by the tempo that is announced before the music is played, so after reading of the music is complete and the music begins to be played, the player can match the timing of the first operation with that music. Therefore, in a music game, errors in operation at the beginning of a portion of music can be reduced.

Moreover, adverse effects during continuous play can be corrected by announcing the tempo of the next portion of music to the player between portions of music. In other words, during continuous play of the game, the previous music remains in the player's head, however, that can be eliminated by announcing the tempo of the next portion of music.

That is, by announcing the tempo while the next portion of music is being read, the feel is switched to the tempo of the next portion of music, so the player is able to match the timing of the initial operation as the music begins to be played. In continuous play as well, errors in operation at the beginning of a portion of music can be reduced.

As a result, for music used in playing a game, the player is able to easily start the game in step with the timing from the beginning of the music.

The game device may further comprise a display output unit that displays an image expressing the game status on a monitor; wherein the tempo announcement unit, based on the acquired tempo information, causes a display configuration of the image to change in step with the tempo of the portion of music while the music reading unit is reading the music. For example, the tempo announcement unit announces the tempo of the next portion of music to the player by causing a message or character in an announcement image to flash in step with the tempo of the portion of music.

In that case, the player is able to visually catch the tempo of the music.

The game device may further comprise an audio output unit that outputs an announcement sound, wherein the tempo announcement unit, based on the acquired tempo information, causes the announcement sound to be outputted in step with the tempo of the portion of music while the music reading unit is reading the portion of music. For example, the tempo announcement unit announces the tempo of the next portion of music to the player by outputting BGM (Back Ground Music) between portions of music (for example, BGM playing while the results image is displayed) in step with the tempo of that music.

In that case, the player is able to audibly catch the tempo of the music.

The tempo announcement unit can cause the announcement sound to be outputted in step with the tempo of the portion of music from the audio output unit from after the portion of music to be used in playing a game is set until before the reproducing unit plays the portion of music.

In this case, while the portion of music is set until it is played, the player can get a feel of the tempo due to the announcement sound, so as the portion of music to be used in playing the game begins, it is possible to match the timing of the first operation to the portion of music.

The reproducing unit may play the portions of music sequentially as a game proceeds; the tempo information acquisition unit may acquire tempo information for each of the portions of music; the music reading unit may read the portion of music to be played next between the portions of music that are sequentially played; and between the portions of music, the tempo announcement unit may announce the tempo of the portion of music that will be played next.

In this case, even in the case of continuously playing a game using portions of music, it is possible to announce the tempo of the next portion of music so as to clear the mind of the player of the previous music.

The tempo announcement method of a third aspect of the present invention is a tempo announcement method of a game device that has a music storage unit, a tempo information acquisition unit, and a tempo announcement unit, and that evaluates the operation of a player that is performed in step with music sounds, and comprises: a tempo information acquisition step; and a tempo announcement step.

First, music to be played (for example, music information specifying a portion of music, tempo information indicating the tempo of a portion of music, and the like) is stored by the music storage unit. In the tempo information acquisition step, the tempo information acquisition unit acquires tempo information for the music. For example, the tempo information acquisition unit acquires tempo information that is stored in the music storage unit, or analyzes the music and acquires the tempo. In the tempo announcement step, the tempo announcement unit, based on the acquired tempo information, announces the tempo of the music before the music is played. For example, the tempo announcement unit generates and displays an announcement image for announcing the tempo of a portion of music, and/or outputs an announcement sound (for example, BGM or a bass sound in step with the tempo) for announcing the tempo of a portion of music.

In this way, the tempo of a portion of music is announced to a player before the music is played. As a result, when playing the game using a selected portion of music, it is possible to match the timing at the beginning of play. In other words, due to the tempo that is announced before the music is played, the player has gotten a feel for the tempo of the music, so as the music begins to be played, it is possible to match the timing of the first operation to the music. Also, in a music game, errors in operation at the beginning of the music are reduced.

Moreover, adverse effects in continuous play can be corrected by announcing the tempo of the next portion of music to the player between portions of music. That is, during continuous play, the previous music that is still in the mind of the player is removed by the sound of the tempo of the next music.

In other words, due to the tempo that is announced before the next portion of music is played, the player is able to switch the senses to the tempo of the next portion of music, so as the music begins to be played, it is possible to match the timing of the first operation to that music. In continuous play as well, errors in operation at the beginning of the music are reduced.

As a result, for music used in playing the game, it can become easy to start play from the beginning of the music.

The information recording medium according to a fourth aspect of the present invention has a program recorded thereon that causes a computer (including an electronic device) that evaluates the operation of a player that is performed in step with music sounds to function as the game device above.

The program according to a fifth aspect of the present invention causes a computer (including an electronic device) that evaluates the operation of a player that is performed in step with music sounds to function as the game device above.

This program can be recorded on a computer-readable information recording medium such as a compact disk, flexible disk, hard disk, magnetooptical disk, digital video disk, magnetic tape, semiconductor memory.

The program can be distributed or sold via a computer network independent of a computer that executes the program. The information recording medium can be distributed or sold independent of that computer.

Effect of the Invention

With this invention, it is possible to provide a game device, tempo announcement method, information recording medium, and program that are suitable for making it possible to perform the first operation at proper timing and easily begin the game.

BRIEF DESCRIPTION OF DRAWINGS

FIG. 8 is a schematic diagram for explaining the state of outputting an announcement sound.

BEST MODES FOR CARRYING OUT THE INVENTION

Embodiments of the present invention are explained below. In the following, in order to make the explanation easier to understand, embodiments of applying the present invention to a game device are explained, however, the invention can similarly be applied to information processing units such as computers, PDAs, and portable telephones. In other words, the embodiments explained below are for explanation, and do not limit the scope of the present invention. Therefore, it is possible for one skilled in the art to employ embodiments wherein all or some of the elements are replaced with equivalent elements; and those embodiments are also included within the scope of the present invention.

Figure 1:
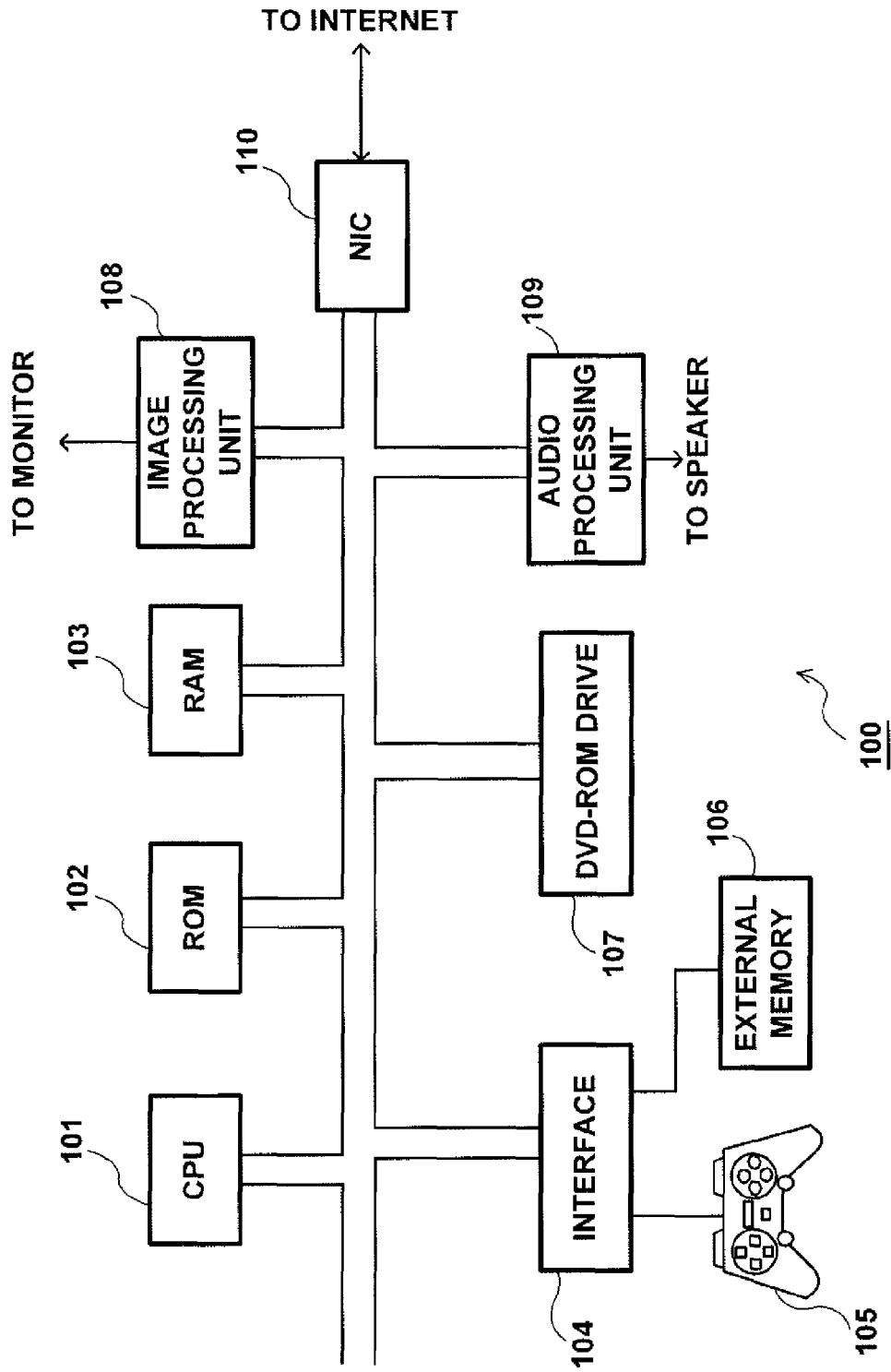
FIG. 1 is a schematic diagram illustrating the basic construction of a typical information processing unit that makes possible the game device of the present invention.

FIG. 1 is a schematic diagram illustrating the basic construction of a typical information processing unit that makes possible the game device of a first or second embodiment of the present invention. In the following, the present invention is explained with reference to the drawings.

An information processing unit 100 comprises: a CPU (Central Processing Unit) 101, ROM (Read Only Memory) 102, RAM (Random Access Memory) 103, interface 104, controller 105, external memory 106, DVD (Digital Versatile Disc)-ROM drive 107, image processing unit 108, audio processing unit 109, NIC (Network Interface Card) 110.

By mounting a DVD-ROM, on which a game program and data are recorded, in the DVD-ROM drive 107, and turning ON the power to the information processing unit 100, the program is executed, making possible the game device of the embodiments of the present invention.

The CPU 101 performs overall control of the operations of the information processing unit 100, and exchanges control signals and data with each of the connected component elements.

An IPL (Initial Program Loader) that is executed immediately after the power is turned ON is stored in the ROM 102, and by executing this IPL, the program that is recorded on the DVD-ROM is read in the RAM 103, and the CPU 101 begins to execute the program. The program for the operating system and various data that are necessary for controlling the overall operation of the information processing unit 100 are stored in the ROM 102.

The RAM 103 temporarily stores data and programs, and stores the program and data that are read from the DVD-ROM, as well as other data necessary for the progression of the game and for chat communication.

The controller 105 connected via the interface 104 receives operation input that was performed by a user during execution of a game. For example, the controller 105, according to operation input, receives input such as a character string (message).

Data, such as data indicating the progress status of a game, and log (record) data of chat communication, are rewritably stored on the external memory 106 that is removably connected via the interface 104. By a user inputting an instruction via the controller 105, these data can be stored suitably in the external memory 106.

A program for making a game possible, and image data and audio data for the game are recorded on a DVD-ROM that is mounted in the DVD-ROM drive 107. According to control from the CPU 101, the DVD-ROM drive 107 performs processing for reading the mounted DVD-ROM, then reads the necessary program and data, and temporarily stores them in the RAM 103 or the like.

After the data that is read from the DVD-ROM is processed by the CPU 101 or by an image operation processor (not illustrated in the figure) of the image processing unit 108, the image processing unit 108 stores that data in a frame memory (not illustrated in the figure) of the image processing unit 108. The image information that is stored in the frame memory is converted into a video signal at specified synchronization timing and outputted to a monitor that is connected to the image processing unit 108. As a result, various image displays become possible.

The image operation processor can execute permeation operations such as superimposing of 2-dimensional images, or a blending, or various saturation operations at high speed.

The image operation processor can also perform high-speed execution using the Z-buffer method to render polygon information that is arranged in a virtual 3-dimensional space and to which various texture information is added in order to obtain a rendered image that looks down on polygons arranged in the virtual 3-dimensional space from a specified viewpoint.

Furthermore, by working together, the CPU 101 and image operation processor can draw a character string to the frame memory as a 2-dimensional image according to font information that defines the text character shapes, and can draw that character string on each polygon surface. The font information is stored in the ROM 102, however, it is also possible to use special font information that is recorded on a DVD-ROM.

The audio processing unit 109 converts audio data that is read from a DVD-ROM into an analog audio signal, and then supplies the audio signal to an external speaker to output sound. For example, the audio processing unit 109, according to control by the CPU 101, creates sound effects or music data to be generated during play of a game, and causes sound corresponding to that data to be outputted from the speaker.

The NIC 110 is for connecting the information processing unit 100 to a computer network (not illustrated in the figure) such as the Internet, and comprises a modem that complies to the 10 BASE-T/100 BASE-T standard that is used in a LAN (Local Area Network), analog modem for connecting to the Internet using a telephone line, ISDN (Integrated Services Digital Network) modem, ADSL (Asymmetric Digital Subscriber Line) modem, and cable modem for connecting to the Internet using a cable television line, and an interface (not illustrated in the figure) that functions as a go-between between the modems and the CPU 101.

In addition, the information processing unit 100 may be constructed such that by using a large-capacity external memory device such as a hard disk, the same functions as the ROM 102, RAM 103, external memory 106 and DVD-ROM mounted in the DVD-ROM drive 107 can be achieved.

Moreover, a form can also be employed wherein a keyboard for receiving editing input for a character string from a user, or a mouse for receiving various position specifications or selection input are connected.

Instead of the information processing unit 100 above, it is also possible to use a typical computer (general-purpose personal computer or the like) as a game device. For example, a typical computer, as in the case of the information processing unit 100 above, comprises a CPU, RAM, ROM, DVD-ROM drive, and NIC, and an image processing unit that has simpler function than the information processing unit 100, and in addition to having a hard disk as an external memory device, is able to use a flexible disk, magnetooptical disk, magnetic tape, and the like. A keyboard and mouse can be used instead of a controller as input devices. After a game program has been installed and that program has been executed, the computer functions as a game device.

(Basic Construction of Game Device)

Figure 2:
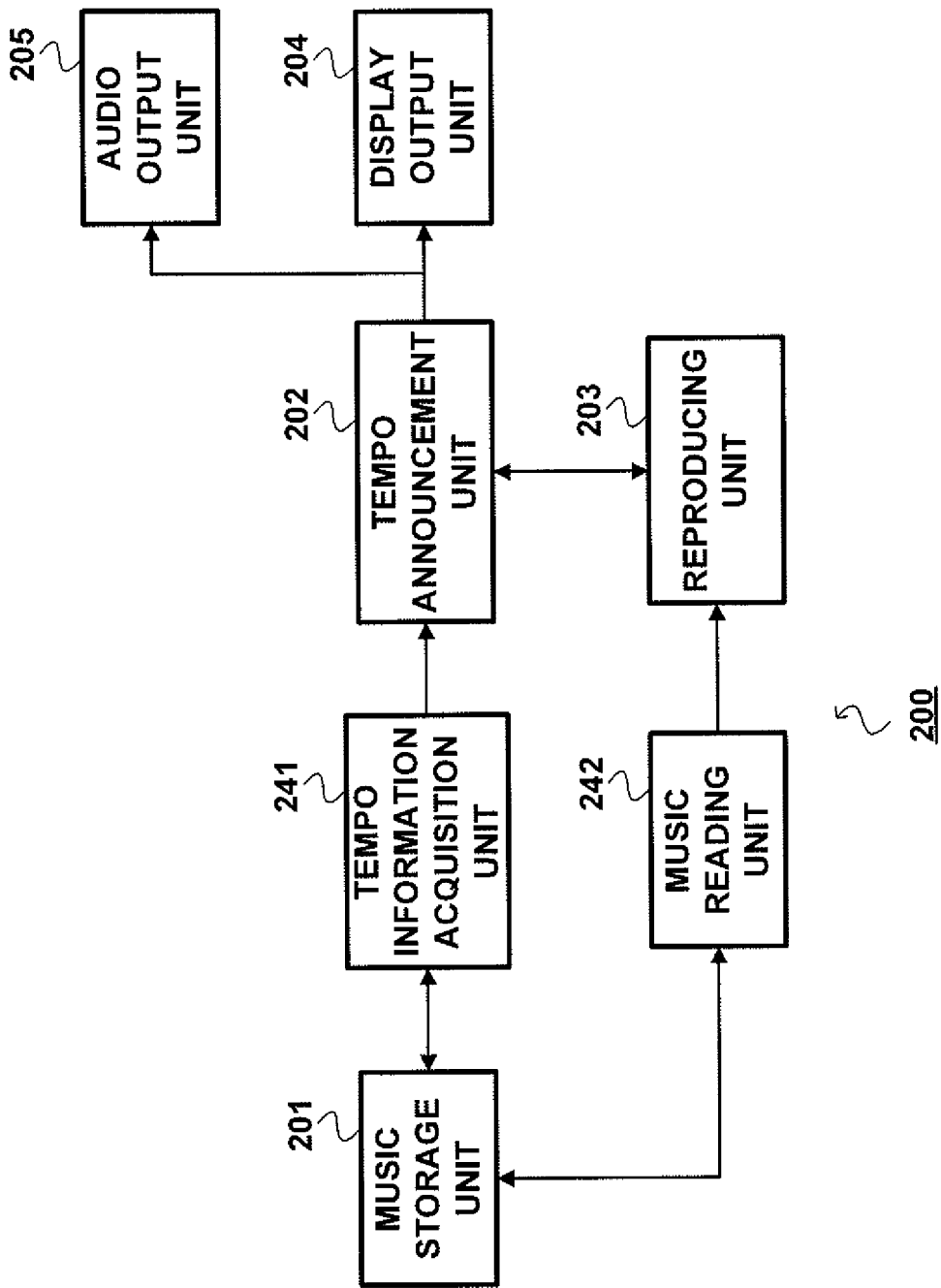
FIG. 2 is a schematic diagram illustrating the basic construction of the game device of the present invention.

In the following, the basic construction of the game device of a first or second embodiment that is made possible using the information processing unit 100 above is explained with reference to FIG. 2.

The game device 200 comprises a music storage unit 201, tempo information acquisition unit 241, music reading unit 242, tempo announcement unit 202, reproducing unit 203, display output unit 204, and audio output unit 205, and is constructed as described below.

The music storage unit 201 stores portions of music.

The tempo information acquisition unit 241 acquires tempo information for music that is to be played.

The music reading unit 242 reads music to a reproducing buffer or the like so that the music can be played.

The tempo announcement unit 202 announces the tempo for the portion of music while the music is being read based on the acquired tempo information.

The reproducing unit 203, after the portion of music has been read, plays the read music.

The display output unit 204 displays images (game images) that express the game status on a monitor. The tempo announcement unit 202, based on the acquired tempo information, changes the display configuration of the game image that is displayed by the display output unit 204 as the music reading unit 242 reads the portion of music in order to correspond to the tempo of that music.

The audio output unit 205 outputs an announcement sound. The tempo announcement unit 202, based on the acquired tempo information, causes the audio output unit 205 to output an announcement sound that was matched with the tempo of the music as the music reading unit 242 reads the music.

In the following, the function of the game device 200 in each embodiment will be explained in detail. The music storage unit 201 in FIG. 2 represents a music information storage unit 210 in FIG. 3 explained below. Similarly, the tempo announcement unit 202 in FIG. 2 represents processing control units 240, 440 in FIG. 3 and FIG. 7, the reproducing unit 203 in FIG. 2 represents a music reproducing unit 260 in FIG. 3, the display output unit 204 in FIG. 2 represents an image generation unit 270 in FIG. 3, and the audio output unit 205 in FIG. 2 represents an announcement sound output unit 480 in FIG. 7.

First Embodiment

Figure 3:
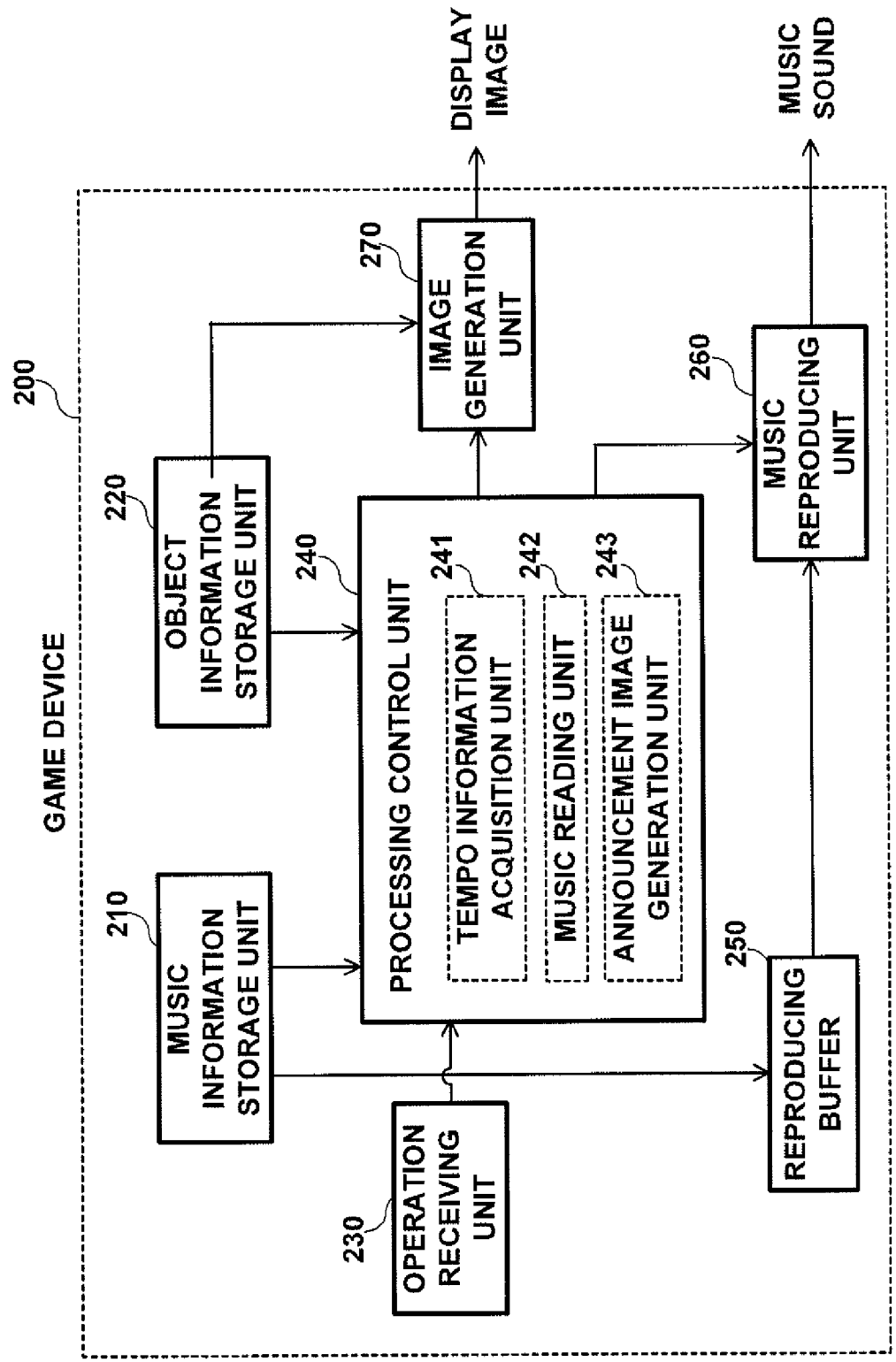
FIG. 3 is a schematic diagram illustrating in detail the basic construction of the game device of a first embodiment of the present invention.

FIG. 3 is a schematic diagram illustrating the basic construction of a game device of the first embodiment of the present invention. One example of this game device is a game device that executes a music game that before playing music (before the game is played), announces the tempo of the music to a player. This game device will be explained below with reference to the drawings.

The game device 200 comprises: the music information storage unit 210, object information storage unit 220, operation receiving unit 230, processing control unit 240, reproducing buffer 250, music reproducing unit 260, and image generation unit 270.

First, the music information storage unit 210 stores a plurality of music information that is played (played back) as the accompaniment of a music game. For example, the music information storage unit 210 stores music information in a specified format such as MIDI (Musical Instrument Digital Interface) data. The player can select a desired portion of music to play the music game in step with the played sound of that music (music sounds).

Moreover, the music information storage unit 210 also stores information related to the music such as tempo (rhythm) information and title information for each portion of music. The stored tempo information can be BPM (Beats Per Minute) as an example.

The DVD-ROM, which is mounted in the DVD-ROM drive 107 described above, and the RAM 103 can function as this kind of music information storage unit 210.

The object information storage unit 220 stores various kinds of object information (image information, position information, and the like) of a display image of a music game.

For example, various kinds of object information are stored such as target objects for specifying the operation of a player (button operation, for example), moving lane that is the movement path for a target object, and decision area as an indicator of the operation timing for the player.

The object information unit 220 also stores various kinds of object information of an announcement image (described later) that is displayed before music is played (before being read).

The DVD-ROM, which is mounted in the DVD-ROM drive 107 described above, and the RAM 103 can function as this kind of object information storage unit 220.

The operation receiving unit 230 receives various operations from a player.

For example, after a music game has started, the operation receiving unit 230 sequentially receives button operations from the player. After receiving a button operation from the player, the operation receiving unit 230 supplies operation information that indicates the contents of the button operation (information of which button was pressed, and the like) to the processing control unit 240.

A controller 105 as described above can function as this kind of operation receiving unit 230.

The processing control unit 240 performs overall control of the game device 200. That is, the processing control unit 240 controls the music reproducing unit 260 and causes the music sounds that are the accompaniment for the music game to be played, and controls the image generation unit 270 and causes a game image to be generated. During a game, the processing control unit 240 evaluates player's operations that are obtained from the operation receiving unit 230.

The processing control unit 240 not only plays a portion of music at a time that was selected by the player during play of the game, but when a player selects portions of music beforehand, the processing control unit 240 is able to sequentially play a portion of music at a time, enabling continuous play of the game.

The processing control unit 240 is characterized by, before playing a portion of music, providing the player with the tempo of that portion of music.

More specifically, the processing control unit 240 includes the tempo information acquisition unit 241, music reading unit 242, and announcement image generation unit 243.

The tempo information acquisition unit 241 acquires tempo information of the portion of music that will be played. In other words, the tempo information acquisition unit 241 reads the tempo information (BPM and the like) that will be played from the music information storage unit 210.

The tempo information acquisition unit 241 may analyze the music and acquire the tempo information such as the BPM.

The music reading unit 242 reads the music that will be played from the music information storage unit 210 to the reproducing buffer 250. That is, the music reading unit 242 reads the music to the reproducing buffer 250 so that the music reproducing unit 260 can play the music.

The announcement image generation unit 243, based on tempo information that is acquired by the tempo information acquisition unit 241, generates an announcement image for announcing the tempo of a portion of music while the music reading unit 242 is reading that music (while the music is being read to the reproducing buffer 250).

Figure 4A:
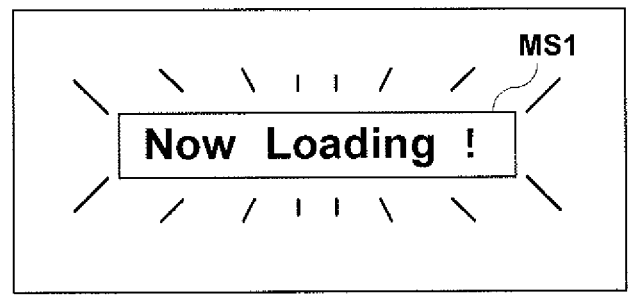
FIG. 4A is a schematic diagram illustrating an example of the announcement image for announcing tempo.

For example, as illustrated in FIG. 4A, the announcement image generation unit 243 causes a message MS1, which indicates that music is being read, to flash in step with the tempo of the portion of music.

Figure 4B:
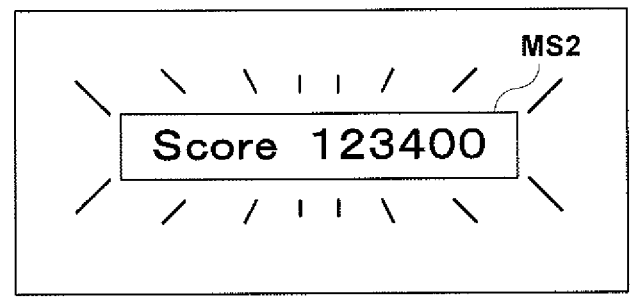
FIG. 4B is a schematic diagram illustrating an example of the announcement image for announcing tempo.

In the case of continuous play, the announcement image generation unit 243, as illustrated in FIG. 4B, causes a result message MS2, which indicates the play results for the previous portion of music, to flash in step with the tempo of the next portion of music.

Figure 4C:
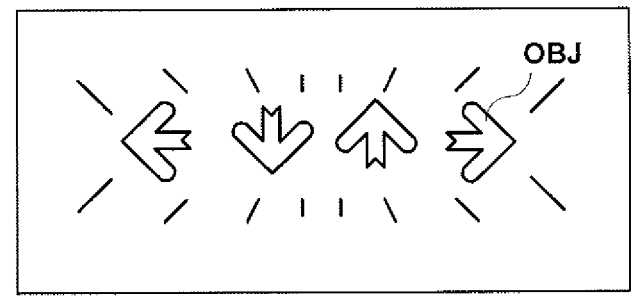
FIG. 4C is a schematic diagram illustrating an example of the announcement image for announcing tempo.

In addition to this, the announcement image generation unit 243 causes an object OBJ, which is used in a music game such as illustrated in FIG. 4C, to flash in step with the tempo of the next portion of music.

In order to announce the tempo, in addition to causing a message or object to flash in this way, it is also possible to cause a message or object to change color, brightness or shape in step with the tempo of the next portion of music.

Moreover, these kinds of messages or objects are examples, and it is also possible to arbitrarily change any display in the game image.

That is, the announcement image generation unit 243 changes the display status of the game image in step with the temp of the next portion of music.

The CPU 101 described above can function as the processing control unit 240 having this kind of construction.

Returning to FIG. 3, the reproducing buffer 250 comprises a memory having a specified capacity, is controlled by the processing control unit 240, and temporarily stores music to be played. In other words, in order that the music reproducing unit 260 can play a portion of music, music information for the music to be played is read from the music information storage unit 210 and stored.

The RAM 103 described above can function as this kind of reproducing buffer 250.

The music reproducing unit 260, being controlled by the processing control unit 240, plays back music sounds for a music game. In other words, after the object portion of music (music information) has been read to the reproducing buffer 250, music information is sequentially played from this reproducing buffer 250 and outputted as music sounds.

The audio processing unit 109 described above can function as this kind of music reproducing unit 260.

The image generation unit 270, being controlled by the processing control unit 240, generates display images (game images and the like) for a music game.

Figure 5:
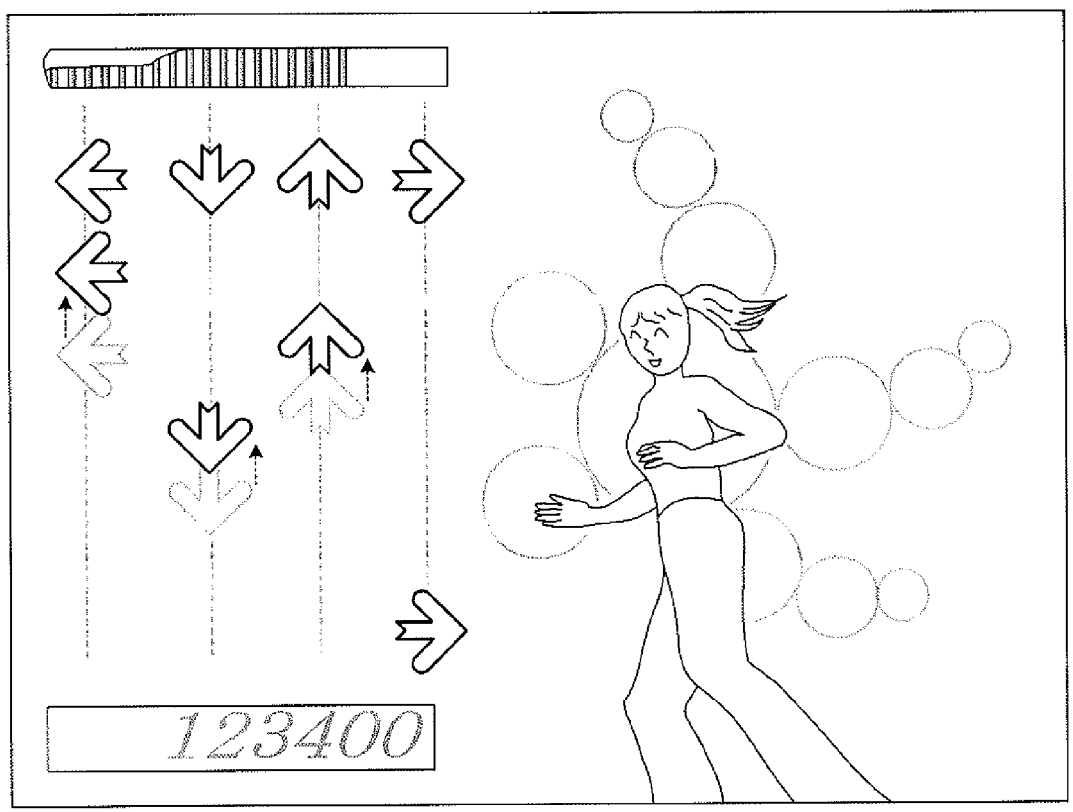
FIG. 5 is a schematic diagram illustrating an example of a game image.

For example, the image generation unit 270 generates a music selection image for prompting the player to select music (a portion or portions of music) for playing the game, and displays that image on the monitor. After the player has selected an arbitrary portion of music, the game begins, and during the game, the image generation unit 270 generates game images as illustrated in FIG. 5.

The image generation unit 270 displays on the monitor an announcement image such as illustrated in FIG. 4A to FIG. 4C described above before the music is played (while reading is in progress). In other words, the image generation unit 270 uses an image to announce the tempo of the music to be used in the playing the game.

The image processing unit 108 can function as this kind of image generation unit 270.

(Outline of Operation of Game Device)

Figure 6:
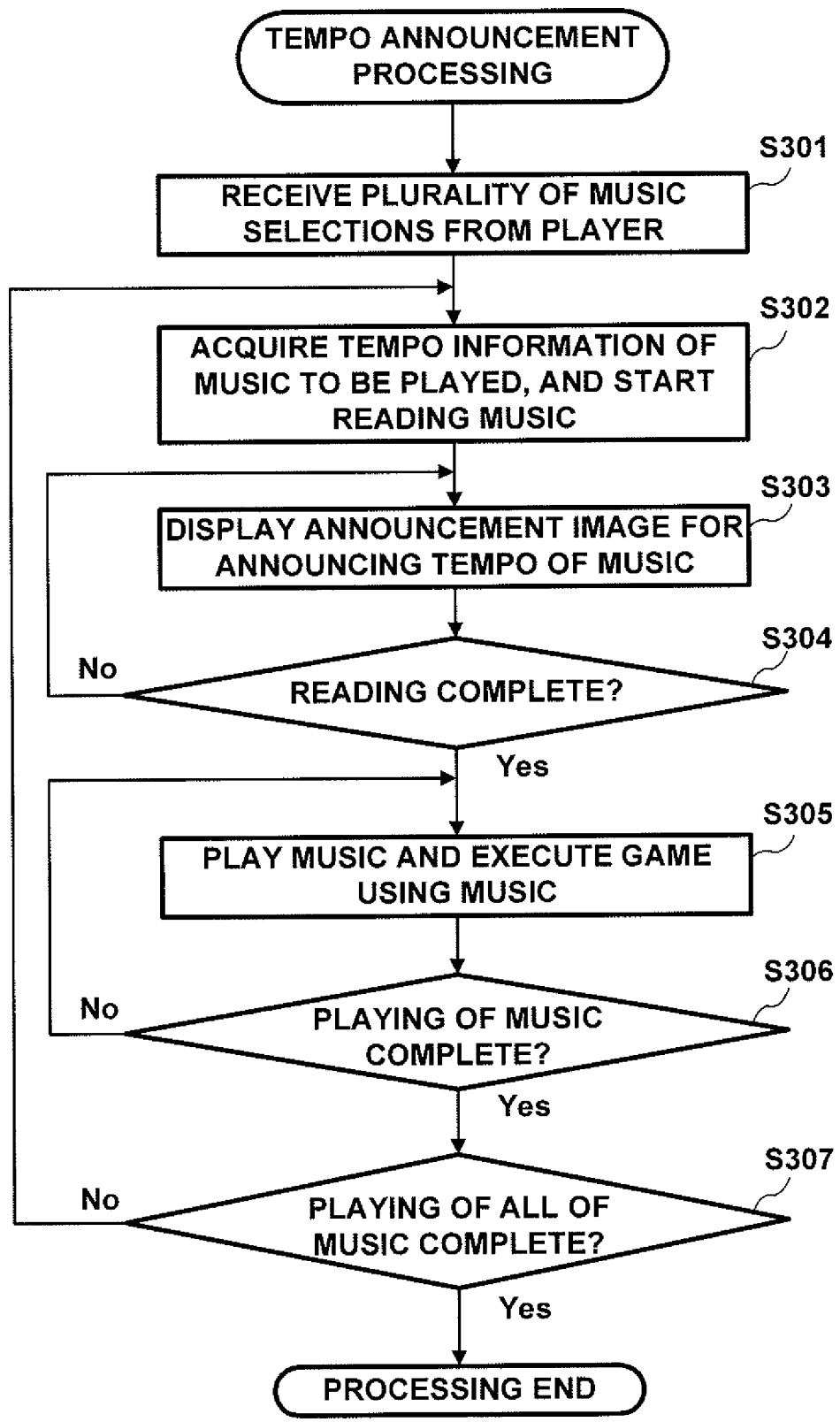
FIG. 6 is a flowchart for explaining the tempo announcement processing of the embodiment of the present invention.

In the following, the operation of the game device 200 having this kind of construction will be explained with reference to the drawings. As an example, the operation of the game device 200 in the case of continuous play of the game by sequentially playing portions of music is explained with reference to FIG. 6 and the like. FIG. 6 is a flowchart illustrating the flow during continuous play of the game of the tempo announcement process of announcing the tempo of the next portion of music to a player before playing the portion of music.

First, the game device 200 receives the selection of portions music from the player (step S301).

For example, with the image generation unit 270 displaying a generated music selection image, portions of music that were selected from the operation receiving unit 230 are identified. In this way, instead of a player selecting each portion of music, it is also possible for the game device 200, for example, to randomly select portions of music from among portions of music that have been used in playing the game in the past.

The game device 200 acquires the tempo information of the music to be played, and begins reading that music (step S302).

In other words, the tempo information acquisition unit 241 acquires the tempo information (such as BPM) of the music that is to be played from the music information storage unit 210. At the same time, the music reading unit 242 begins reading that music from the music information storage unit 210 to the reproducing buffer 250.

The game device 200 displays an announcement image for announcing the tempo of the music (step S303).

That is, the announcement image generation unit 243, based on the tempo information that was acquired by the tempo information acquisition unit 241, generates an announcement image for announcing the tempo of the music while the music reading unit 242 reads the music.

For example, the announcement image generation unit 243 generates an announcement image as illustrated in FIG. 4A to FIG. 4C described above, and provides the player with the tempo of the music that is being read. More specifically, in the case of the announcement image in FIG. 4B, the announcement image generation unit 243 causes a result message MS2 that indicates the game results for the previous portion of music to flash according to the tempo of the next portion of music. When playing the game using the first portion of music, an announcement image as illustrated in FIG. 4A is displayed, and the player is provided with the tempo of the portion of music that is being read.

The game device 200 determines whether or not reading of the music has been completed (step S304), and when the music is still being read (step S304: NO), the display of the announcement image continues in step S303 described above.

On the other hand, when reading of the music is complete (step S304: YES), the game device 200 plays the music, and executes the game using that music (step S305).

In other words, the music reproducing unit 260 sequentially plays the music information from the reproducing buffer 250, and outputs music sounds. The image generation unit 270 switches from the announcement image as illustrated in FIGS. 4A to 4C above to a game image as illustrated in FIG. 5, and starts the game.

During the game, the image generation unit 270 displays game images in which objects and the like move according to the music that is played, then acquires button operations by the user from the operation receiving unit 230, and evaluates the operations.

The game device 200 determines whether or not the play of the music is complete (step S306), and when the music is still being played (step S306: NO), the game using that music continues in step S305 described above.

On the other hand, when the play of the music is complete (step S306: YES), the game device 200 determines whether or not play of all portions of the music has been completed (step S307). In other words, the game device 200 determines whether the game has been completed for all of the selected portions of music.

When it is determined that not all portions of the music has been played (step S307: NO), the game device 200 returns to the processing in step S302, and repeatedly executes the processing in steps S302 to S307 above.

On the other hand, when it is determined that the play of all portions of the music has been completed (step S307: YES), the game device 200 ends the tempo announcement processing.

With this kind of tempo announcement processing, the tempo of the next portion of music is announced to the player before the music is played (while the music is being read). As a result, when playing a game using music, it is possible to easily match the timing well at the beginning of play.

In other words, the player has a feel for the tempo of a portion of music by the tempo that is announced before the music is played, so as the music begins to be played, the player can match the timing of that music (go with the music). Therefore, in a music game, errors in operation at the beginning of a portion of music can be reduced.

Adverse effects during continuous play that were concerned in the past can be corrected by announcing the tempo of the next portion of music to the player between portions of music. In other words, during continuous play of the game, the previous music remains in the player's head, however, that can be eliminated by announcing the tempo of the next portion of music.

That is, by announcing the tempo of the next portion of music before it is played, the feel is switched to the tempo of the next portion of music, so the player is able to match the timing of the initial operations as the music begins to be played. In continuous play as well, errors in operation at the beginning of a portion of music can be reduced.

As a result, for music used in playing a game, the player is able to easily start in from the beginning of the music, or in other words, is able to easily start the game in step with the timing.

Second Embodiment

In the embodiment above, the case of announcing to the player the tempo of a portion of music by changing the display configuration of a message or the like in an announcement image was explained, however, the method of announcing the tempo is not limited to changing the display configuration in this way, and can be suitably changed.

For example, a sound effect when a music selection image is displayed (a set sound when selecting a portion of music) is outputted as an announcement sound for announcing the tempo of a portion of music. Instead of the sound effect, audio may be outputted as the announcement sound for announcing the tempo of a portion of music. In other words, it is also possible to announce the tempo of a portion of music to the player by outputting an announcement sound that corresponds to the tempo of the portion of music when that portion of music is selected (for example, a short portion of the music such as one bar).

Figure 7:
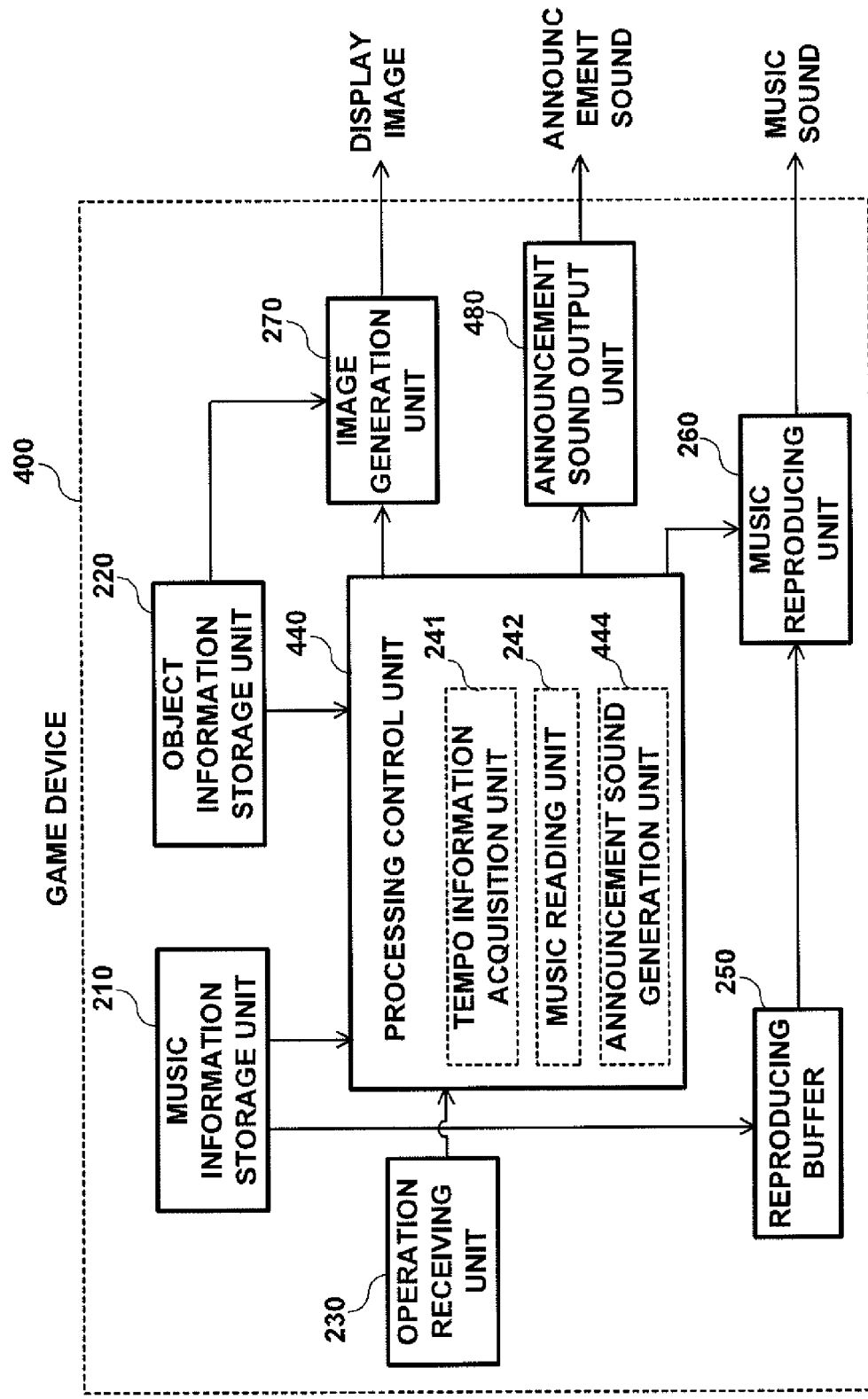
FIG. 7 is a schematic diagram illustrating the basic construction of a game device of a second embodiment of the present invention.

In the following, a game device characterized by announcing the tempo of a portion of music to a player by using audio (announcement sound) is explained with reference to FIG. 7. FIG. 7 is a schematic diagram illustrating the basic construction of a game device 400 of the second embodiment of the present invention.

As illustrated in FIG. 7, the game device 400 comprises: a music information storage unit 210, object information storage unit 220, operation receiving unit 230, processing control unit 440, reproducing buffer 250, music reproducing unit 260, image generation unit 270, and announcement sound output unit 480.

That is, construction is such that the processing control unit 240 in the game device 200 in FIG. 3 described above is replaced by the processing control unit 440, and furthermore, the announcement sound output unit 480 is added.

The processing control unit 440 includes a tempo information acquisition unit 241, music reading unit 242, and announcement sound generation unit 444. In other words, construction is such that the announcement image generation unit 243 of the processing control unit 240 described above is replaced by the announcement sound generation unit 444.

The image generation unit 270, as in the embodiment described above, displays on the monitor a music selection image for prompting the player to select music to be used in playing the game. The player selects (sets) music to be used in playing the game from the music selection image.

After music has been set using the music selection image, the announcement sound generation unit 444 generates an announcement sound that matches the tempo of that music.

For example, the announcement sound generation unit 444 stores data of music that will be the basis of the announcement sound (short portion of music such as one bar, for example), and when the music to be used in playing the game has been set, generates the announcement sound that matches the tempo of the set music.

The tempo of the music can be obtained as tempo information from the tempo information acquisition unit 241 for the portion of music at the cursor position on the music selection image (temporarily selected music). After the music has been set, the announcement sound generation unit 444 generates the announcement sound that matches the tempo of the set music.

Moreover, during continuous play, the announcement sound generation unit 444 generates BGM (Back Ground Music) that is played during the results display (score display or the like) as an announcement sound that matches the tempo of the next music used in playing the game.

The announcement sound output unit 480 outputs the announcement sound that was generated by the announcement sound generation unit 444.

In other words, the announcement sound output unit 480 outputs the announcement sound, which matches the tempo of the music that will be used in playing the game, from right after the music is set until just before that music is played.

More specifically, as illustrated in FIG. 8, the announcement sound output unit 480 starts outputting the announcement sound immediately from the timing t1 at which the music was set. That is, the output of the announcement sound that matches the tempo of the music that will be used in playing the game is started.

During that time, the music reading unit 242 starts reading the music to be used in playing the game (timing t2), and after that, reading of that music is completed (timing t3).

Before the music reproducing unit 260 starts playing the music (for example, just before timing t4), the announcement sound output unit 480 ends outputting the announcement sound. In other words, instead of the announcement sound, the music used in playing the game (music sounds) begins to be played, and the game proceeds.

In the case of continuous play, the announcement sound output unit 480 outputs an announcement sound, which matches the tempo of the next portion of music to be used in playing the game, from the time that the results display starts until just before that music to be used in the game next is played.

Even in the game device 400 having this kind of construction, the tempo of a portion of music is announced to the player by sound (announcement sound) before that music is played. As a result, when playing the game using selected music, it is possible to match the timing at the beginning of play.

In other words, from the time the music is set until the music is played, the player has already gotten a feel for the tempo by way of the announcement sound, so as the music begins to be played in order to play the game, it is possible to match the timing of the first operation. Also, in a music game, errors in operation at the beginning of the music are reduced.

Moreover, adverse effects in continuous play, which were concerned in the past, can be corrected by announcing the tempo of the next portion of music to the player using sound (announcement sound) between portions of music. That is, during continuous play, the previous music that remains in the player's head is removed by the sound of the tempo of the next music.

In other words, from the announcement sound that is outputted from the time of the results display until the next portion of music is played, the player is able to switch the senses to the tempo of the next portion of music, so as the music begins to be played, it is possible to match the timing of the first operations to that music.

As a result, for music used in playing the game, it can become easy to start play from the beginning of the music, or in other words, it can be easy to start the game by matching the timing to the music.

In the second embodiment described above, the case of outputting short portion music (audio) that matches the tempo of the music to be used in playing the game was explained, however, the announcement sound is not limited to this kind of music, and can be suitably changed.

For example, a relatively simple sound (rhythm sound or the like) such as a bass sound or drum sound that matches the tempo of music used in playing the game may be outputted.

In the first and second embodiments above, the case of separately displaying an announcement image or outputting an announcement sound in order to provide the player with the tempo of music was explained; however, both of these may be performed at the same time.

For example, the processing control unit 240, 440 of the game device 200, 400 is configured to have both the announcement image generation unit 243 and announcement sound generation unit 444 described above. The image generation unit 270 described above displays an announcement image for announcing the tempo of a portion of music, and also the announcement sound output unit 480 described above outputs an announcement sound for announcing the tempo of a portion of music.

In this case, by using the announcement image and announcement sound before the portion of music is played, the tempo of that music can be more forcibly announced.

As a result, for music that is to be used in playing the game, it is possible to easily start the game by matching the timing from the start of the music.

This application claims priority based upon Japanese Patent Application No. 2009-073207, the disclosure of which is incorporated herein by reference in its entirety.

INDUSTRIAL APPLICABILITY

As explained above, with the present invention, it is possible to provide a game device, tempo announcement method, information recording medium, and program that are suitable for making it possible to perform the first operation at proper timing and easily begin the game.

EXPLANATION OF REFERENCE NUMBERS

100 Information processing unit
101 CPU
102 ROM
103 RAM
104 Interface
105 Controller
106 External memory
107 DVD-ROM drive
108 Image processing unit
109 Audio processing unit
110 NIC
200, 400 Game device
201 Music storage unit
202 Tempo announcement unit
203 Reproducing unit
204 Display output unit
205 Audio output unit
210 Music information storage unit
220 Object information storage unit
230 Operation receiving unit
240, 440 Processing control unit
241 Tempo information acquisition unit
242 Music reading unit
243 Announcement image generation unit
250 Reproducing buffer
260 Music reproducing unit
270 Image generation unit
444 Announcement sound generation unit
480 Announcement sound output unit

The invention claimed is:

1. A game device that evaluates an operation of a player, the operation being performed in step with music sounds, the game device comprising:
   a music storage unit that stores music that is to be played;
   a tempo information acquisition unit that acquires tempo information of the music; and
   a tempo announcement unit that, based on the acquired tempo information, announces a tempo of the music before the music is played.

2. A game device that evaluates an operation of a player, the operation being performed in step with music sounds, the game device comprising:
   a music storage unit that stores portions of music;
   a tempo information acquisition unit that acquires tempo information of a portion of music that is to be played;
   a music reading unit that reads the portion of music so that the portion of music can be played;
   a tempo announcement unit that, based on the acquired tempo information, announces a tempo of the portion of music while the portion of music is being read; and
   a reproducing unit that plays the read music after the portion of music has been read.

3. The game device according to claim 2, further comprising
   a display output unit that displays an image expressing a game status on a monitor; wherein
   the tempo announcement unit, based on the acquired tempo information, causes a display configuration of the image to change in step with the tempo of the portion of music while the music reading unit is reading the portion of music.

4. The game device according to claim 2, further comprising
   an audio output unit that outputs an announcement sound, wherein
   the tempo announcement unit, based on the acquired tempo information, causes the announcement sound to be outputted in step with the tempo of the portion of music while the music reading unit is reading the portion of music.

5. The game device according to claim 4, wherein
   the tempo announcement unit causes the announcement sound to be outputted in step with the tempo of the portion of music from the audio output unit from after the portion of music to be used in playing a game is set until before the reproducing unit plays the portion of music.

6. The game device according to claim 2, wherein
   the reproducing unit plays the portions of music sequentially as a game proceeds;
   the tempo information acquisition unit acquires tempo information for each of the portions of music;
   the music reading unit reads the portion of music to be played next between the portions of music that are sequentially played; and the tempo announcement unit announces the tempo of the portion of music that will be played next between the portions of music.

7. A tempo announcement method of a game device that has a music storage unit, a tempo information acquisition unit, and a tempo announcement unit, and that evaluates an operation of a player, the operation being performed in step with music sounds, the tempo announcement method comprising:

storing music to be played by the music storage unit;

a tempo information acquisition step of the tempo information acquisition unit acquiring tempo information of the music; and a tempo announcement step of the tempo announcement unit, based on the acquired tempo information, announcing a tempo of the music before the music is played.

8. A non-transitory computer-readable information recording medium that records a program that causes a computer to function as, the computer evaluating an operation of a player, the operation being performed in step with music sounds comprising:

a music storage unit that stores music that is to be played;

a tempo information acquisition unit that acquires tempo information of the music; and a tempo announcement unit that, based on the acquired tempo information, announces a tempo of the music before the music is played.

\* \* \* \* \*